United States Patent [19]

Skinner et al.

[11] Patent Number: 5,105,862
[45] Date of Patent: Apr. 21, 1992

[54] EXTENSIONS FOR A MATERIAL SUPPORT PLATFORM OF A TOOL

[76] Inventors: Kevin R. Skinner, 280 Dove Song Ct., Paradise, Calif. 95969; Theo E. Skinner, 14842 Masterson Way, Magalia, Calif. 95954

[21] Appl. No.: 716,991

[22] Filed: Jun. 18, 1991

[51] Int. Cl.⁵ .................................. B25H 1/04
[52] U.S. Cl. ........................ 144/287; 83/471.3; 144/286 R
[58] Field of Search .............. 83/471.2, 471.3; 108/48, 77, 97, 103, 135, 142; 144/286 R, 286 A, 287

[56] References Cited

U.S. PATENT DOCUMENTS

| | | |
|---|---|---|
| 3,342,226 | 9/1967 | Marcoux et al. |
| 4,068,551 | 1/1978 | Kreitz. |
| 4,341,247 | 7/1982 | Price .......................... 144/287 |
| 4,798,113 | 1/1989 | Viazawko. |
| 5,038,650 | 8/1991 | Hodge ......................... 104/287 |

Primary Examiner—W. Donald Bray

[57] ABSTRACT

A left and right hand material support platform-extension each comprised of an elongated flat surface horizontally disposed in use, one lengthwise side edge of each is affixed with a short vertical material guide fence. The bottom surface of one end of each platform-extension has a longer hingedly attached telescopic support leg, with the opposite bottom end of each platform-extension having a shorter hingedly attached leg which is structured for clamping between the panels of a portable work bench of the type having a central full length vise or clamping arrangement. Each platform-extension is essentially a mirror image of the other for positioning one platform-extension on each side of a portable tool having an integral material support platform such as a miter or radial arm saw which is supported conveniently elevated by the work bench containing the vise. The short legs of the platform-extensions each include an adjustable depth gauge for readily positioning the top surface of the platform-extensions flush with the top surface of the miter or radial arm saw material support platform prior to tightening the vise of the portable work bench to secure the platform-extensions stationary ready for use.

10 Claims, 5 Drawing Sheets

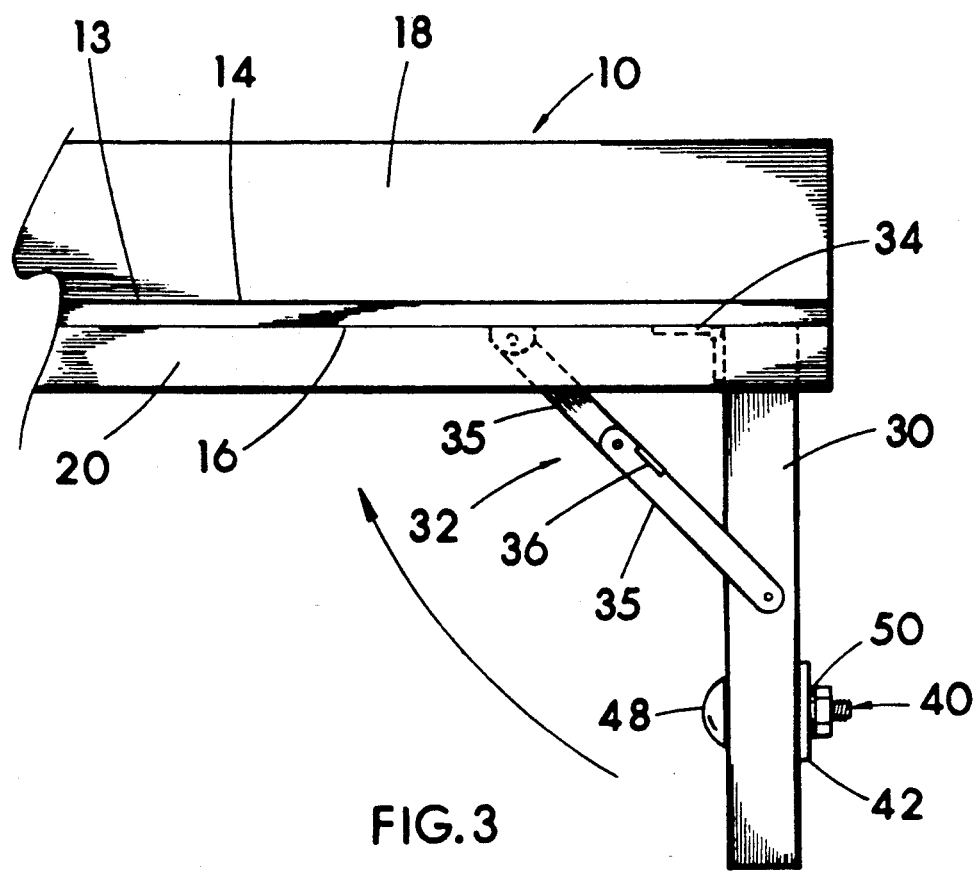
FIG. 3
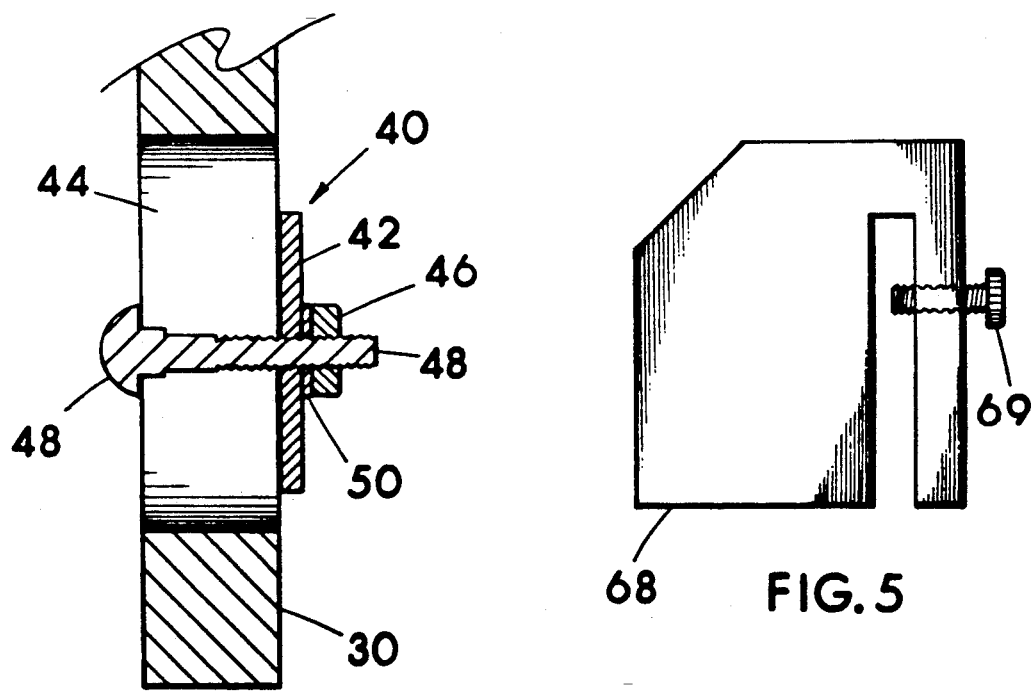
FIG. 4
FIG. 5

EXTENSIONS FOR A MATERIAL SUPPORT PLATFORM OF A TOOL

BACKGROUND OF THE INVENTION

1. Field of the Invention

This invention is an accessory device useful for extending the integral material support platform common to some portable tools such as portable radial arm saws and portable miter saws of the types commonly used in carpentry. Our material support platform-extensions are additionally structured for cooperative use with a foldable, portable work bench which has a raised bench top supported by elongated legs, and further having an adjustable gap running the full length of the bench top surface for use in clamping objects. The most common of these portable work benches available on the market is sold under the trade name of "Workmate", which is described on the packaging as a work bench vise, and is manufactured and sold by Black and Decker, Inc., 70-T Joppa Rd., Towson, Md. 21204 U.S.A.

2. Description of the Prior Art

Although our invention is applicable to portable power radial arm and miter saws, and possibly other similar tools such as small portable wood surface planers and small portable table saws all of which include integral material support platforms, for the sake of briefness and simplicity, a portable power miter saw will generally be the portable tool primarily described in relationship to the invention of this disclosure.

Miter saws are primarily used in carpentry for making angled and transverse cuts in baseboard, crown molding, door casings, and other interior and exterior building materials. The majority of miter saws used today in carpentry are portable electrically powered units which include a short horizontal material support platform with a vertical rear material guide fence and an adjustably positionable circular saw hingedly affixed to and supported above the material support platform. Typical portable power miter saws additionally have short support legs affixed to the bottom surface of the material support platform. The short support legs of the miter saw position the top surface of the material support platform of the saw only about 10 to 15 centimeters above the surface which the miter saw is set on. The purpose of the material support platform of a miter saw or like tool is to give the operator a surface on which to rest a board or member in order to stabilize the board while feeding and guiding the board into a saw blade. The guide fence typically attached to the material support platform of miter and radial arm saws further assist the operator in stabilizing and guiding the board, and positioning the board at a given angle relative to the saw blade.

One reason for the wide popularity of portable power miter saws are their portability, typically weighing less than 20 kilograms, and therefore they can easily and quickly be transported to and from the job-site, and about the job-site for convenient and efficient use close to the work. The reasoning for the shortness of the support legs and the short material support platform of a portable miter saw or like tool is to keep the tool highly portable and light in weight.

The miter saw is intended to allow the various angles as well as straight cuts to be made accurately. However, the short horizontal material support platform of a portable miter saw makes it difficult for accurately making cuts in long material as the unsupported end of the material not resting on the short material support platform of the miter saw tends to pull downward under its own weight, thus pulling the opposite end of the material upward toward the saw blade. This tends to frequently result in an unintentional slight bevel or irregular cut. To compensate for this effect, the carpenter must forcefully hold the end of the material to be cut against the platform surface and guide fence of the saw, which can be difficult as the carpenter must also correctly position the material, and operate the saw at the same time. The requirement of the carpenter having to forcefully hold or press one end of the long material downward onto the material support platform of the miter saw adjacent the rotating saw blade is also dangerous, being somewhat analogous with cutting an object with a very dull knife, where due to the degree of pushing force, slipping and injuring one's self can easily occur. Additionally, it should be noted that portable miter saws on construction sites are very often set on the floor, a situation requiring the carpenter to repeatedly bend down during the workday which can lead to fatigue and reduced productivity.

Since the material support platform of the miter saw is short, normally in the range of 40 to 60 centimeters in length, there is no feasible way to provide a stop block or length gauge block to which to abut the end of an elongated board to be cut, which would eliminate the necessity of marking the location where the material was to be cut. Stop blocks are particulary useful when cutting a plurality of pieces all to the same length. Without a stop block, each piece of material to be cut must be individually marked before cutting. This is not only time consuming for the carpenter, but there is also more room for error in measurement.

Since many carpenters already own a work bench vise of the type previously described, material support platform-extensions for a miter saw or like tool which could be used in conjunction with a work bench vise would offer significant advantages. Other structural arrangements of material support platform-extensions not specifically structured for use with the work bench vise as a raised platform, would necessarily have to provide an additional raised platform or table to support the miter saw if the miter saw were to be raised significantly upward to eliminate the need for the carpenter to be repeatedly bending downward during the workday. This additional raised platform or bench, in addition to a work bench vise that many carpenters already have, would add weight and consume more of the already limited space available in the carpenter's vehicle. Therefore, there is a need for a lightweight, easily assembled material support platform-extension for a portable miter saw or like tool which is compatible with existing work bench vises currently available in the market and already owned by large numbers of craftsmen.

A past art patent search was conducted at the U.S. Patent and Trademark Office to examine devices pertinent to our invention, and the following are considered relevant:

Viazanko was granted U.S. Pat. No. 4,798,113, on Jan. 17, 1989, for EXTENSION TABLE APPARATUS FOR POWER SAW. Viazanko's device includes a support base for a miter saw and a two-piece extension table. The extension tables have two foldable telescopic legs on one end, with the second opposite end of each extension table attachable directly to the ends of the miter saw with a detachable connection. This detachable connection requires attachment of a support angle or bracket to the miter saw table. A single smaller hinged leg is also attached to the second end of both extension tables for use in supporting the structure on a work bench when the support base is not used.

On Jan. 17, 1978, Kreitz was issued U.S. Pat. No. 4,068,551 for an EXTENSION TABLE FOR POWER SAWS. Kreitz's device teaches a folding extension table for radial arm saws and the like already having a support table. The extension table is also affixed to the table surface of the radial arm saw with bolts.

Marcoux et al teaches a COLLAPSIBLE WORK TABLE in U.S. Pat. No. 3,342,226, issued Sept. 19, 1967. Marcoux's device includes a support table for a power tool with an attachable accessory extension table. The extension table does not have a guide fence nor means for supporting a stop block.

None of the related past art devices we are aware of are specifically structured for, nor suitable for use with a portable work bench vise supporting a portable power miter saw or like tool, nor are they structured similar to our invention. Although Viazanko's device might at first glance appear to be structured similar to our invention, it includes no structuring for quickly adjusting the height of the material support platform extension when being clamped within a work bench vise. Therefore a great deal of time would generally be required for adjusting the height of Viazanko's extension tables when used in conjunction with the portable work bench vise to provide level surfaces with that of the miter saw resting on the work bench. With Viazanko's device this adjustment procedure would also have to be done each time the extension tables were used. Additionally, although Viazanko's device does include a short hingidly attached support leg somewhat adjacent one end of each of his left and right table extensions, the short support legs are intentionally set back a sufficient distance from the end of the table extensions which abut the saw in order to clear the base to which the miter saw is bolted. This "set back" placement of Viazanko's short hingidly attached legs would prohibit the clamping of his short legs into the clamp of a work bench vise while reserving sufficient room between the clamped left and right table extensions to set a miter saw. Although Viazanko does provide a quick clamping structure for attachment of the extension tables directly to the miter saw table, attachment of a support bracket to the miter saw is required. This attachment apparently requires permanent alteration of the miter saw table by the drilling of holes. This is initially quite time consuming, and further permanently alters and possibly weakens the miter saw.

SUMMARY OF THE INVENTION

Our material support platform-extensions for a portable miter saw or like tool of the immediate invention are highly portable, weighing preferably less than 20 kilograms to allow hand carrying of a set of two extensions, that is, a left and a right hand side platform-extension. Additionally our platform-extensions are structured to be able to be readily set-up, taken down, transported to and from the job site, and about the job site, and conveniently stored in a small amount of space. In an effort to maintain minimal bulk, weight, and redundancy in equipment a carpenter must purchase and transport, our material support platform-extensions for a miter saw or like tool are structured to be used in conjunction with a portable work bench vise. Since many carpenters already own a portable work bench of this type, our invention significantly adds to the usefulness of the equipment the carpenter already typically has and uses.

As briefly stated above, the immediate invention is provided as a two piece material support platform-extension for extending the length of an existing material support platform of a portable miter saw or like tool, and is specifically structured for cooperative use with an available work bench vise of the type which is foldable and has a central full length clamping vise. Our platform-extensions are provided in a left hand and right hand side version which are essentially mirror images of one another, and may be used as a set to extend the material support platform of the miter saw or like tool on each end thereof.

Each of our platform-extensions include a main elongated member which provides a flat material support platform or surface which is horizontally disposed during use, and a vertical material guide fence extending the full length of one lengthwise side edge of each material support platform-extension. The guide fence provides a surface to which to abut the side edge of a board or other member to be cut, and also provides a convenient location to adjustably affix a stop block to which the end of a member to be cut may be abutted prior to cutting.

One end of each of our platform-extensions has a length adjustable hingedly attached telescopic leg to assist in supporting and flushing the top surface of the platform-extensions with the top surface of the integral material support platform of the miter saw or like tool. The adjustable length of the telescopic legs allows the convenient use of our platform-extensions on uneven grade where different legs lengths are required to flush the saw platform and our platform-extensions with one another. The telescopic legs are for supporting the ends of the platform-extensions which are positioned further from the work bench vise and the miter saw resting conveniently elevated on the work bench during use. The distal end of each telescopic leg rests against the grade or floor. The opposite end of each platform-extension has a shorter hingedly attached leg.

The shorter legs of our platform-extensions are structured to be engaged between the elongated clamp of a portable work bench vise, one short leg clamped on each side of a miter saw which is resting on top of the work bench. Affixed to each shorter leg is an elongated plate, horizontally disposed in use, which extends outward beyond the side width of the short leg on either side thereof so the elongated plate may span the open gap of the vise of the work bench vise. The plate affixed to each short leg may be adjusted vertically in height on the short leg and then affixed stationary. This horizontal plate serves as an adjustable depth gauge, and once initially adjusted and fixed, supports and stabilizes the end of the platform-extension at the proper height flush with the top surface of the miter saw material support platform prior to the clamp of the work bench vise being tightened onto the short leg. The edges of the depth gauge plate rest on the top surface of each of the two horizontal panels of the portable work bench vise which define the vise or clamp gap, with the short leg extending into the clamp gap opening of the work bench between the two horizontal panels of the work bench. The depth gauge eliminates the need to properly adjust the height of our platform-extensions to that of the miter saw each time the platform-extensions are put to use or moved to a more convenient location on a large job site. This saves a great deal of time and is much easier than trying to simultaneously manually support the ends of both the left and right hand platform-extensions adjacent the miter saw while also operating the clamp portion of the work bench vise.

The depth gauge does not appear to be able to be feasibly permanently affixed during the manufacturing stage of our invention due do the number of different makes and models of portable miter saws and like tools, many of which have slightly varied leg lengths from one another which position the top of the miter saw material support platform at a given height above a surface on which the miter saw or like tool is resting.

Therefore, with our invention, a carpenter may initially set the depth gauge of the short legs so the top surface of our material support platform-extensions rest flush with the top surface of the material support platform of his miter saw, then tighten the depth gauge. Additionally, the carpenter may adjust the length of the longer telescopic legs for use with his particular miter saw and work bench vise for use on a level grade. After these initial settings of the short legs and longer telescopic legs, in the future as long as the same miter saw is used with the same work bench vise and set of our material support platform-extensions on level grade which will often be the case, it will be quick and convenient to simply unfold all of the legs and drop the short legs into a properly opened clamp gap in the work bench vise and have the top surfaces of the material support platforms all fall into a flush, straight, and stable alignment prior to tightening the clamp of the bench. The depth gauge additionally prevents the short leg from slipping further downward through the clamp gap during use, which otherwise could sometimes occur even with the short leg clamped relatively tightly in the work bench vise.

With both our left and right hand material support platform-extensions properly positioned and tightly clamped in the work bench vise, one platform-extension positioned against each end of a miter saw resting on top of the bench, a terminal end of each platform-extension will be closely adjacent or tightly pressing against the two oppositely disposed ends or sides of the miter saw material support platform. This tight pressing or close adjacency serves to assist in stabilizing the miter saw in place, since normally the miter saw would only be resting and not affixed on the top surface of the work bench vise. In this condition, the miter saw may still be slid back and forth on the work bench vise in order to align the guide fences of the miter saw with the guide fences of our platform-extensions in a straight line with one another, but the saw is substantially prevented from racking sideways out of alignment with the platform-extension during use.

Additionally, in order to solve a problem common to many prior art devices, our platform-extensions are generally comprised of components substantially affixed together making it difficult to misplace any of the components since they are fastened to one another, and thereby the risk to the carpenter of losing pieces over a period of time and having to locate and purchase lost parts may be kept to a minimum.

Therefore, a primary object of our invention is to provide material support platform-extensions for use with a portable power miter saw or a like tool which may be used in conjunction with a portable work bench vise.

A further object of our invention is to provide the above which has an adjustable depth gauge which generally automatically aligns one end of each material support platform-extension flush with the top surface of the material support platform of the portable miter saw or like tool.

An even further object of our invention is to provide the above in platform-extensions which are simple and dependable in use, and may be conveniently used on level or unlevel grade.

Another object of our invention is to provide the above in platform-extensions which are lightweight, easily transported and stored, compatible with various makes and models of portable power miter saws and like tools, and which may be manufactured relatively inexpensively.

Other objects and advantages of our invention will prove apparent with a reading of the remaining specification and comparison with our numbered drawings.

BRIEF DESCRIPTION OF THE DRAWINGS

FIG. 3 is an enlarged side view of our left hand side material support platform-extension illustrating the hingedly attached short leg;

FIG. 4 is an enlarged cross-sectioned view of the lower end of the short leg illustrating our adjustable depth gauge;

FIG. 5 is an end view of an adjustably placeable stop block useful as part of our invention;

DESCRIPTION OF THE PREFERRED EMBODIMENT

Figure 1:
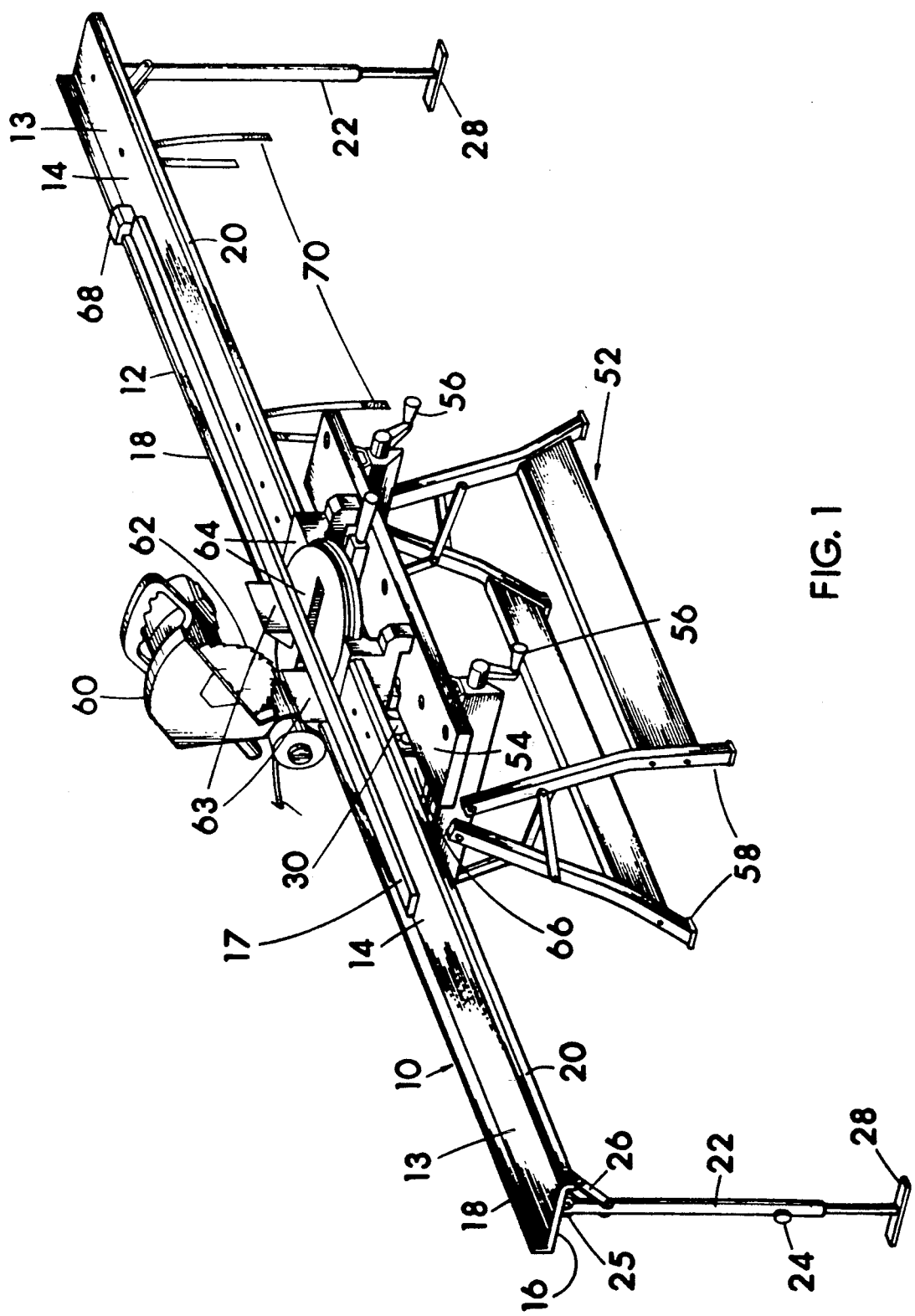
FIG. 1 is a frontal perspective view of our material support platform-extensions in use with a portable power miter saw conveniently elevated by a portable foldable work bench vise in accordance with the immediate invention.

Referring now to the drawings in general where our material support platform-extensions are illustrated in accordance with the immediate invention. Our material support platform-extensions are provided in two separate generally mirror image sections designated left platform-extension 10 and right platform-extension 12. Platform-extensions 10 and 12 are each comprised of a main elongated member formed of relatively thin but substantially rigid material and designated panel 13. Each panel 13 has a flat widened top surface 14 of a width of about 15 to 30 centimeters, and an oppositely disposed bottom surface 16. Each panel 13 may be of any reasonable length, such as somewhere between 60 to 300 centimeters for example. Fasteners such as rivets or bolts utilized to affix the various hinges and brackets therefore, and straps which will be described later to panels 13 should be kept recessed or flush with the top surface 14 of panels 13 so as to not extend upward and interfere with the placement and sliding of members or boards 17 placed on top surface 14 to be cut.

The panels 13 each have one lengthwise side edge affixed with a short upward extending guide fence 18 providing a 90 degree corner at the intersection between the panels 13 and guide fences 18 on top surfaces 14 as may be seen in FIG. 1. It is not critical that guide fences 18 be directly adjacent the side edges of panels 13, although this placement is seen to be most feasible. Guide fences 18 extend upward perpendicular from top surface 14 of panels 13 about 10 to 20 centimeters for example, leaving a substantial portion of the wide flat surface 14 of the panels 13 exposed on which to rest a board 17 as shown in FIG. 1. The guide fences 18 provide an abutment surface for the side edge of a board or member 17 to be cut. The oppositely disposed lengthwise side edge from fence 18 of each panel 13 has a narrow downwardly projecting finish lip 20 primarily to add rigidity to that edge of the panels 13. The panels 13 with guide fences 18 and lips 20 may be economically manufactured out of a lightweight rigid material such as aluminum or plastic as extruded one-piece units with guide fence 18 and lip 20 being extruded integral to each panel 13. Guide fence 18 and lip 20 both help to add rigidity to the thin panels 13, and therefore assist in allowing the rigid structure to be maintained light in weight and lower in cost by reducing the amount of raw material necessary to form the structure.

Affixed to bottom surface 16 of both panels 13 are hingedly attached telescopic legs 22. Telescopic leg 22 of left platform-extension 10 is affixed to the left end thereof, while telescopic leg 22 of right platform-extension 12 is affixed to the right end, as may be ascertained in FIG. 1. Each telescopic leg 22 is shown in the drawings as being comprised of a two piece elongated hollow tubular member which may be rectangular or round, with the smaller tubular member slidably adjustably positionable within the outer member to provide variable length adjustment of telescopic leg 22. The smaller interior tubular member of telescopic leg 22 can be releasibly affixed stationary in position relative to the larger outer member with the use of a releasable locking structure such as a threaded thumbscrew 24 for example. Threaded thumbscrew 24 is comprised of a threaded shank with exposed handle, the distal end of the shank may abut the smaller interior telescopic member, with the threaded shank passing through a threaded bore in the outer telescopic member. This type of releasable locking structure allows for small increment length adjustability of telescopic leg 22 and is therefore desirable, although other known releasible locking structures for telescopic members may work as feasible alternatives, such as compression fittings. Length adjustability in legs 22 is desirable for ease of setting up platform-extensions 10 and 12 on uneven ground surfaces, and for various bench and tool material support platform heights.

Each telescopic leg 22 should be extendable to at least a length equal to a distance from the grade or floor to the bench top of the work bench vise 52 with the work bench 52 set up in an in-use position, plus the distance from the top of the work bench vise 52 to the top of the material support platform 64 of the miter saw 60 or like tool, plus 15 centimeters or so of additional length for adjustments on uneven grade. A much greater maximum length could be used in the telescopically adjustable legs 22 to accommodate a variety of material support platform heights of portable tools with a single set of our platform-extensions 10 and 12.

Figure 2:
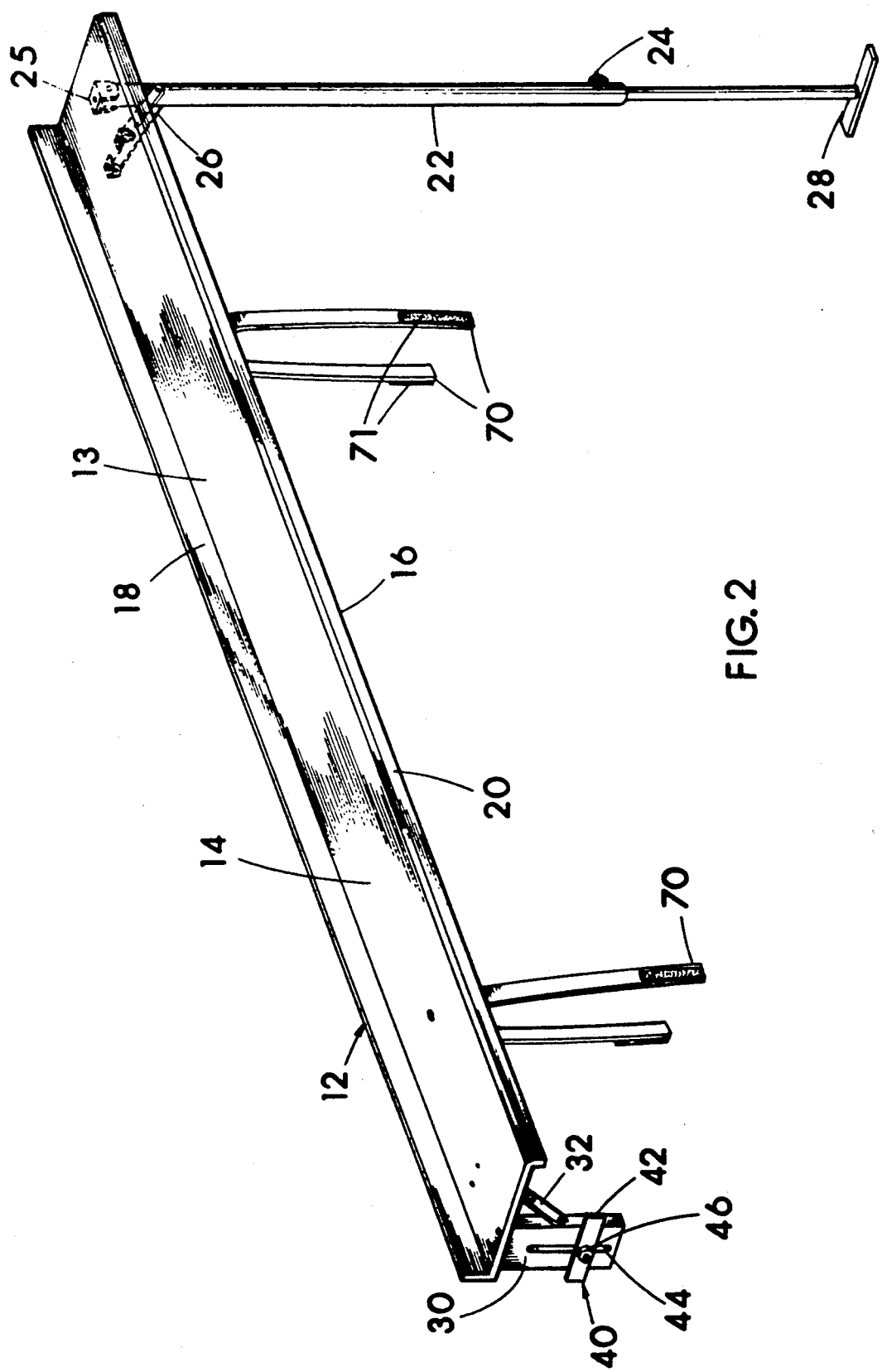
FIG. 2 is a front perspective view of our right hand side material support platform-extension.

Each telescopic leg 22 is shown in the drawing affixed centrally adjacent one end of panel 13 to bottom surface 16 by way of a U-shaped member 25 straddling the terminal end of the legs 22, with U-shaped member 25 supporting a hinge pin passed through the terminal end of telescopic leg 22. Additionally, two folding support hinges 26 each comprised in part of a two piece pivotally attached elongated bar or member which is centrally foldable, and which may be releasibly locked into the unfolded or extended position to limit movement of the leg 22. One end of each support hinge 26 is pivotally affixed to a small angle bracket affixed to bottom surface 16 of panel 13, and the opposite end of each support hinge 26 is pivotally affixed to telescopic leg 22 as shown in FIGS. 1 and 2. When support hinges 26 are extended, leg 22 should be positioned substantially perpendicular to the bottom surface of panel 13 as shown in FIG. 2. U-shaped member 25 and folding support hinges 26 are of the same type of hinging commonly used on the foldable legs of most portable card tables and portable picnic tables. The hinging allows telescopic legs 22 to be folded up against bottom surface 16 when not in use, and unfolded and releasibly locked at a 90 degree angle or straight down from the bottom of panel 13 for use. Support hinges 26 are desirably manufactured relatively tight at the pivotal connections so as to provide frictional resistance to the legs 22 from swinging freely under their own weight when in the folded or stored position against panels 13, with this attribute also being common to many card table style leg hinges. Support hinges 26 and the brackets therefor, and U-shaped members 25 may be affixed to panels 13 with rivets or other fastening arrangements such as bolting or welding.

The distal end of the smaller interior telescopic member of telescopic leg 22 is desirably affixed with a flat rectangular stabilizer foot 28. Foot 28 may be removably affixed or permanently affixed to telescopic leg 22, and may be pivotally connected to allow tipping toward one end or the other of the platform-extension, although this pivoting of feet 28 does not seem necessary at this time, it may prove to be convenient for use on unlevel and uneven grade. The widened surface area of the stabilizer feet 28 help provide lateral stability to platform-extensions 10 and 12 when in use, and additionally help prevent the legs 22 from sinking into soft soil.

Bottom surface 16 of the second end of both platform-extensions 10 and 12, opposite to the attachment of telescopic legs 22, is affixed with a relatively short and rigid leg 30. Each short leg 30 may be hollow rigid rectangular tubing of metal or plastic for weight and cost considerations. Each short leg 30 may be somewhere between 10 and 15 centimeters in width, or normally approximately half the width of panels 13 as may be ascertained from FIG. 2 and 6. This width is to allow the clamping of the short legs 30 into the elongated clamp gap 66 of a work bench vise 52 without the top horizontal surface of the bench 52 being so narrowed in the process of closing the gap 66 onto short legs 30 as to provide insufficient space on which to securely set a power miter saw 60 or like tool as will be better understood with continued reading. We having considered making the width of the short legs 30 adjustable, however this adjustable width structure would cost more to manufacture, and is not seen necessary at this time. The thickness of each short leg 30, best shown in FIG. 3, should be at least 4 or 5 centimeters or more so as to present a sufficiently wide and generally flat surface for contacting the clamping surfaces of the work bench vise 52 so as to assist in providing for a degree of lateral stability or prevent sideways racking of platform-extensions 10 and 12 relative to the work bench when secured to work bench vise 52. Short legs 30 normally need to be of a length somewhere between 15 and 40 centimeters, normally 25 centimeters will allow enough adjustability to work with all of the various makes and models of portable power miter saws 60 currently on the market today of which we are aware. The length of short legs 30 could be just about any length, and we have considered structuring the legs 30 using telescopic tubing in order to provide even greater length adjustability thereto, but again due to the additional costs of manufacturing a telescopically length adjustable short leg 30 relative to the need, it does not seem feasible at this time as opposed to simply making short leg 30 to a given reasonable fixed length which would accommodate a variety of portable tools.

Short legs 30 in the drawings are shown positioned more toward the side edge of panel 13 toward guide fence 18 as opposed to being centered on panels 13. This off-center placement of short legs 30 adjacent one end of panel 13 has been found to function well with most all portable miter saws 60 and work bench vises 52 to allow the resting of the miter saw 60 on the work bench 52 and to be able to affix platform-extension 10 and 12 to the work bench 52 with the forward faces of guide fences 18 aligned flush with the forward faces of the guide fences 63 common to portable miter saws 60 as may be ascertained from FIG. 1. This off-center placement of short legs 30 is primarily due to the material support platform 64 of most miter saws 60 will not be normally positioned centered directly over gap 66 of work bench 52. It should be noted that a centrally positioned short leg 30 would be within the scope of our invention and may be desirable with certain combinations of work bench vises 52 and miter saws 60 or like tools as these work benches 52 and miter saws 60 or like tools are still being slightly changed and improved upon periodically by the manufacturers.

Each short leg 30 is affixed to bottom surface 16 of panels 13 adjacent the end of each platform-extension 10 and 12. Although short leg 30 does not need to be affixed flush with the end of each panel 13, short leg 30 must be sufficiently close to the end so as to allow ample space for miter saw 60 when positioned on the surface of work bench vise 52. If short legs 30 were affixed too far from the end of each panel 13, there would either be no room between the two panels 13 for miter saw 60 or the length of clamping panels 54 would be too short to engage both short legs 30.

Each short leg 30 is affixed to the bottom surface 16 of panels 13 with a hinging arrangement substantially the same in principle as that described above for telescopic legs 22, and quite similar in structure. The hinging arrangement for each short leg 30 may include a combination of hinge members 32 and 34, best shown in FIG. 3, and which are also similar to card table style leg hinging arrangements. Hinge member 34 is similar to a common cabinet hinge and is affixed to the upper end of short leg 30 and to bottom surface 16 of panel 13. The hinge members 32 and 34 allow short leg 30 to swing from a horizontal to vertical position, and vise versa, or from a stored position adjacent the bottom surface 16 of panel 13 to a 90 degree or perpendicular in-use position as shown in FIG. 1. Hinge members 32, being support hinges substantially the same as support hinges 26 on telescopic legs 22, limit the short leg 30 in its movement to about 90 degrees relative to bottom surface 16 of panel 13. Hinge members 32 are elongated foldable flat bars comprised of two foldable legs 35 pivotally attached together centrally and including locks 36 comprised of a tab on one leg 35 engagable against the adjacent leg 35 at the central pivotal connection when the two legs 35 are in general straight line alignment with one another. Locks 36 are to releasibly maintain legs 35 of hinge members 32 in an extended position. Legs 35 of hinge 32 are pivotally affixed one end to the right lengthwise side of short leg 30 and the other leg 35 to the opposite side left side, with the oppositely disposed ends of each hinge 32 pivotally affixed to angle brackets attached to bottom surface 16 of the platform-extensions 10 or 12. Hinge members 32 and 34 are also preferably relatively tight at the pivotal connections so as to provide frictional resistance to the short legs 30 from swinging freely under their own weight when in the folded or stored position against panels 13. Hinge members 32 and 34 and the brackets therefor may be affixed to panels 13 with rivets or other suitable fastening arrangements such as with bolting or welding.

Figure 6:
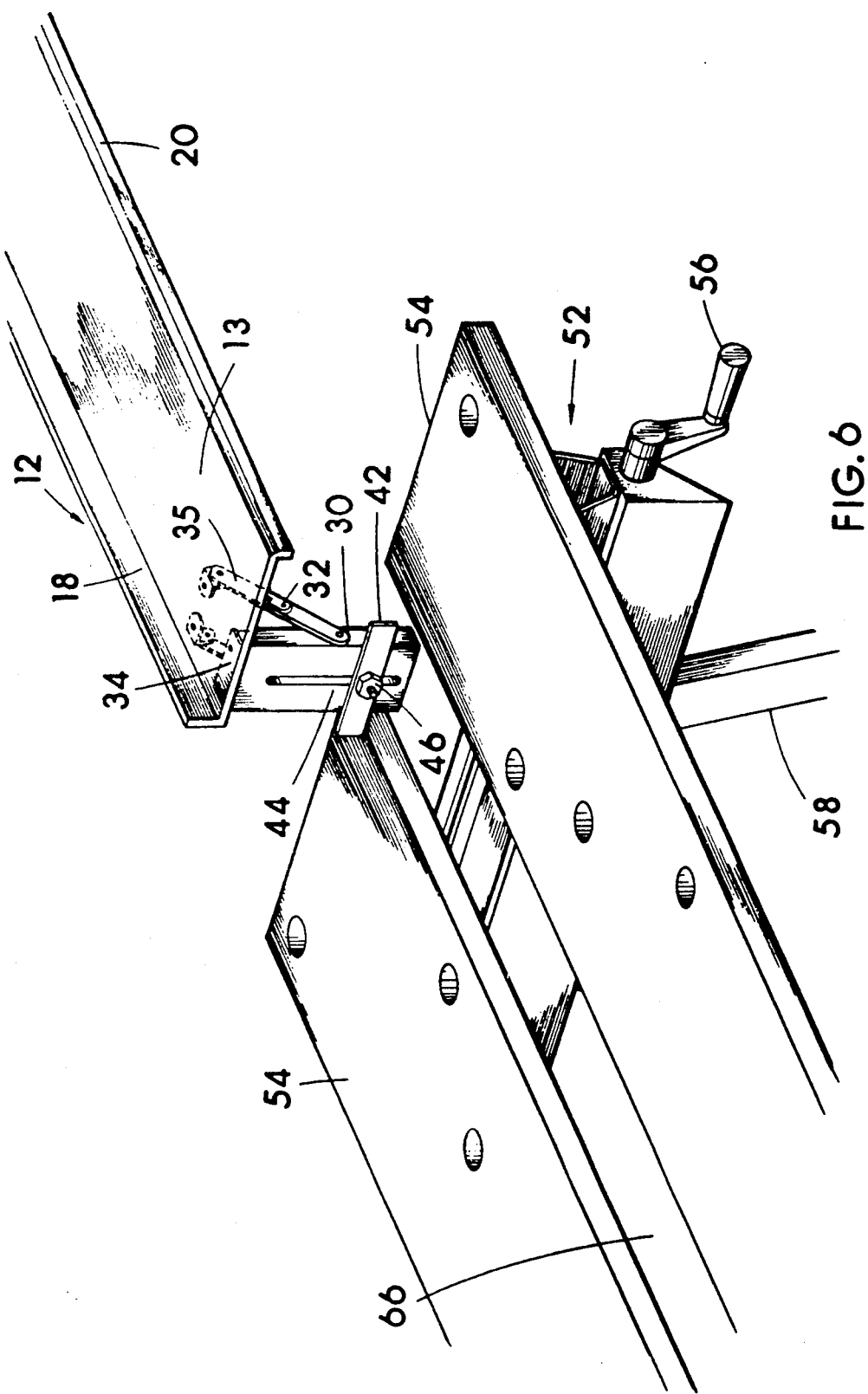
FIG. 6 is a top perspective partial view of one end of our right hand material support platform-extension with the short leg positioned for attachment between the clamping panels of the work bench vise.

Also affixed to each short leg 30 is an adjustable depth gauge 40. Depth gauge 40 in the example shown in the drawings is basically comprised of support bracket 42 which is a thin, substantially rigid elongated rectangular panel or plate which is attached horizontally to one broad flat surface of short leg 30, as shown in FIG. 6. Each support bracket 42 is movably retained by a carriage bolt 48 and a washer 50 and nut 46, with bolt 48 passing through an elongated slot or channel 44 through short leg 30 and through a central aperture in support bracket 42. The enlarged head of bolt 48 prevents it from being pulled through channel 44. The opposite end of bolt 48 is retained, along with support bracket 42 and washer 50, by nut 46, as shown in FIG. 4. The support brackets 42 extend outward beyond the width of the short legs 30 on each side thereof as may be best ascertained from FIG. 6. Although not illustrated, support bracket 42 may be structured to remain horizontal and not to rotate or pivot as nut 46 is rotated. This anti-roll or pivot feature if needed may be provided by a number of methods, such as by utilizing an elongated tongue on the surface of short leg 30 which slidably fits into a groove on the back surface of bracket 42 for example.

Figure 7:
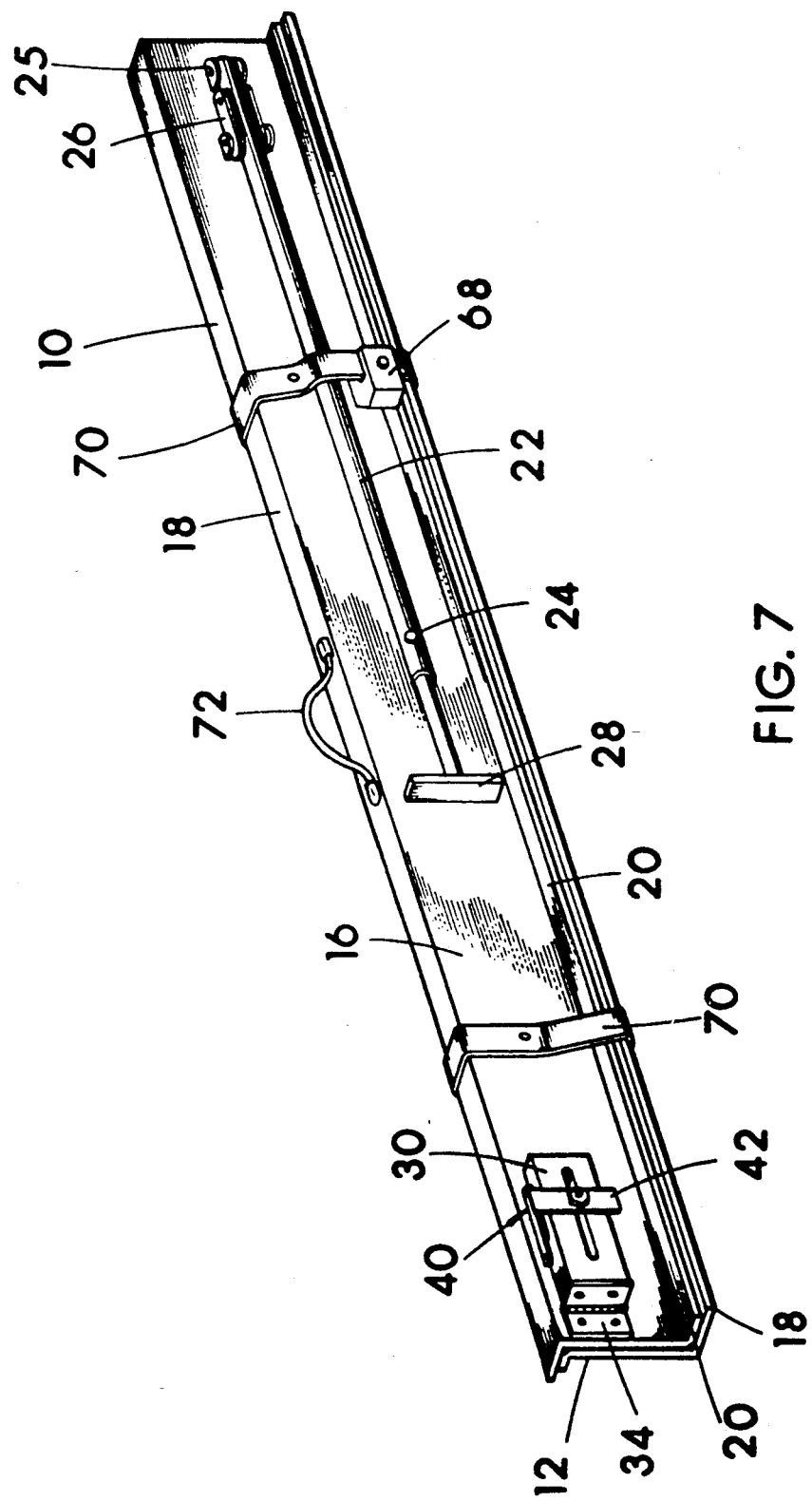
FIG. 7 is a perspective view of both our left and right hand side material support platform-extensions affixed together by straps for convenient transportation and storage.

As may be ascertained from FIG. 7, telescopic legs 22 and short legs 30 both fold inward toward the center of the panels 13, toward each other of storage. If the length of panels 13 were manufactured insufficient to allow for this stored positioning of the legs 22 and 30 as shown in FIG. 7, then the legs 22 and 30 could be laterally off-set from one another so as to lie side-by-side to one another when folded, or staggered in height relative to each other so foot 28 would be resting on top of the folded short leg 30 when the legs 22 and 30 were folded into the stored position.

Each short leg 30 is particularly structured for convenient attachment to portable work bench vise 52. Work bench vise 52 is basically comprised of at least two parallel rectangular clamping panels 54 operated by hand cranks 56, and a support base 58 having foldable legs. Work bench vise 52 is used as a table for supporting and raising miter saw 60, as shown in FIG. 1. Miter saw 60 generally includes an electrically powered circular blade 62, and a small horizontal material support platform 64 with short support legs, and two short vertical guide fences 63, one fence 63 on each side of the blade 62. The width of our platform-extensions 10 and 12 is roughly sized to match the width of a typical portable miter saw material support platform 64, although this is not critical.

To initially assemble platform-extensions 10 and 12 for use on a level floor, work bench vise 52 should first be unfolded and set up into an in-use position. Miter saw 60 is then set on the top surface of clamping panels 54 of work bench vise 52 with two front legs of the saw 60 positioned on one clamping panel 54 and the rear legs of saw 60 positioned on the other clamping panel 54. To initially set depth gauge 40 at the correct level, the distance from the top surface of the miter saw material support platform 64 to the top surface of clamping panels 54 of bench 52 is precisely measured. This measurement is then used to mark the distance from the top surface 14 of platform-extensions 10 and 12 to the lower edge of their respective support brackets 42. Nut 46 must be loosened to allow vertical movement of support bracket 42 within channel 44. Once support bracket 42 is correctly positioned, nut 46 is re-tightened to secure support bracket 42 in place. The square neck of carriage bolt 48 preferably rests within the vertical walls of channel 44 and prevents bolt 48 from rotating freely as nut 46 is tightened or loosened.

Once support bracket 42 is correctly positioned in place and secured to the short leg 30, the length of telescopic legs 22 may be set. To initially set legs 22 at the correct length, the distance from the top surface of miter saw material support platform 64 to the level floor or ground beneath bench 52 is accurately measured. Utilizing this measurement, each leg 22 is then positioned and affixed measuring from the top surface 14 of the platform-extension 10 or 12 to the bottom surface of stabilizer foot 28. The corresponding platform-extensions 10 and 12 can be affixed to their respective ends of work bench vise 52 with saw 60 on the bench 52 using the following procedure.

Referring to FIG. 6 where short leg 30 of right platform-extension 12 is shown positioned over the gap 66 between the two clamping panels 54 of the work bench vise 52. Telescopic leg 22 should be locked straight down in the in-use position at this time. By adjusting gap 66 slightly wider than the width of short leg 30 and slightly narrower than the width of support bracket 42, a procedure which can actually be easily accomplished by sight with a little practice although a measuring tape may be used, the lower end of short leg 30 can be dropped into gap 66 while the lower edges of support bracket 42 can be lowered onto the top surface of clamping panels 54. Support bracket 42 can then support platform-extension 12 without manual help from the user. The terminal left end of right platform-extension 12 is then tightly abutted with the right edge of miter saw 60 with the lower end of short leg 30 moving freely in gap 66. The short leg 30 of platform-extension 10 is then dropped in gap 66 on the other side of miter saw 60 and the end of platform-extension 10 is pressed tightly against the adjacent end of the saw 60. Clamping panels 54 are then tightly secured against short legs 30 by rotating hand cranks 56 of work bench vise 52. Caution should be taken to align into a straight line the forward faces of guide fences 18 flush with the forward faces of the guide fences 63 of miter saw 60 as may be ascertained from FIG. 1.

A stop block 68 may be used with our platform-extensions 10 and 12. A suitable stop 68 is shown in FIG. 5, and attached to fence 18 in FIG. 1. Stop block 68 should be is slidably positionable along either guide fence 18. Stop block 68 shown in FIG. 5, and in an in-use position in FIG. 1, is primarily a rectangular block-like structure having a fissure open on three sides, running through stop block 68, adjacent the back edge. The fissure is sized for insertion over guide fence 18. A locking structure, such as a threaded thumb screw 69 as shown in the drawings, is used to releasibly secure stop block 68 in position on guide fence 18. When stop block 68 is secured to guide fence 18, a portion of the stop block 68 should be resting closely adjacent top surface 14 of panel 13 to allow the abutment of the end of even a thin board or member 17 against the block 68 as may be ascertained from FIG. 1.

To disassemble platform-extensions 10 and 12 from the in-use position shown in FIG. 1, for storage and or transportation, both short legs 30 are released from clamping panels 54 of work bench vise 52. Telescopic legs 22 and short legs 30 are folded up against bottom surface 16 of panels 13, as shown in FIG. 7, where frictional tightness of the leg hinges help retain the legs in the folded position. The telescopic legs 22 and depth gauges 40 of short legs 30 may be left adjusted as initially set and described above. The platform-extensions 10 and 12 are oriented and abutted against one another as shown in FIG. 7 with the two bottom surfaces 16 and the support legs 22 and 30 facing outward and the terminal ends of panels 13 aligned. Attachment straps 70, shown in FIG. 2 and 7 as flexible belts with hook and loop 71 style fasteners on the two free ends of each strap 70, are shown as an example of suitable structuring which may be used to secure the platform-extensions 10 and 12 together. Each of the attachment straps 70 are shown affixed to bottom surface 16 of one panel 13 with rivets or other suitable fasteners. Stop block 68 may be conveniently stored on one of the straps 70 as shown in FIG. 7 by slipping the fissure of the stop block 68 over one strap 70 and tightening threaded thumb screw 69 onto the strap 70 to releasibly secure the stop block 68 for storage until needed.

For convenient carrying of the affixed together platform-extensions 10 and 12 shown in FIG. 7, a carrying handle 72 is desirably affixed to the back surface of guide fence 18 of at least one of the platform-extension 10 or 12 for convenient one hand handling of the unit.

It should be noted only one of our platform extensions 10 or 12 may be utilized to extend only one side of a miter saw 60 material support platform 64, although the use of both platform-extensions 10 and 12 together to extend both sides of the platform of the miter saw 60 as described above would seem more feasible under most conditions as may be ascertained from FIG. 1 where a board 17 to be cut is shown.

Additionally, it should be noted that it is not considered necessary nor desirable for the short legs 30 with or without depth gauges 40 to extend downward to the grade or floor when made and used in accordance with the immediate invention. We have considered building our platform-extensions 10 and 12 with each platform-extension 10 and 12 including two long identical telescopic legs 22, one leg 22 hingidly attached at the two oppositely disposed ends of each extension 10 and 12 and eliminating the short legs 30 and depth gauges 40. In this contemplated structure, one telescopic leg 22 of each platform-extension 10 and 12 would be clamped into the vise of the work bench vise 52 as previously described for the short legs 30 with depth gauges 40, and this to give lateral stability to the extensions 10 and 12, with the feet 28 of each telescopic leg 22 of the left and right hand side extension 10 and 12 being placed against the grade or floor. This structure would be possibly less expensive to manufacture since identical legs 22 and hinging therefor could be used on each end of our platform-extensions 10 and 12. However, it is desirable and necessary to be able to quickly set up a work bench vise 52, place a portable tool such as a miter saw 60 on the top of the bench 52, and then to connect our extension-platforms 10 and 12 ready for use. It should be noted that it is not critical that the top surface of the work bench vise 52; the material support platform 64 of the miter saw 60; and our platform-extensions 10 and 12 should all be perfectly level with the earth according to a carpenter's level, since on unlevel ground this would take a substantial amount of time to achieve. What is fairly critical is that the material support platform 64 of the miter saw 60, and our platform-extensions 10 and 12 all be in generally flush and a straight line alignment with one another, the top surfaces all lying in the same straight plane, and with this plane not being critically important to be lying perfectly horizontally or level with the earth. This flush and straight line alignment of the top surfaces of the material support platform 64 of the miter saw 60 and of our platform-extensions 10 and 12 can most quickly and conveniently be accomplish utilizing the short legs 30 with depth gauges 40 described above which do not contact the ground beneath the work bench vise 52, a situation which leaves only two telescopic legs 22 in contact with the ground which would need to be individually adjusted when the invention was set up and used on unlevel grade, as opposed to having to individually adjust four telescopic legs 22 to proper length if our short legs 30 with depth gauges 40 were not utilized. In other words, the principles of our short legs 30 with depth gauges 40 for clamping into the vise of the work bench vise 52 are quite important to the efficient and convenient use of our platform-extensions 10 and 12.

Although we have very specifically described the structures of the immediate invention, it should be understood that the specific details are given for example. Many minor changes in the specific structures described and shown in the drawings may be readily made without departing from the scope of our invention, and therefore it should be understood that the scope of our invention should not to be overly limited by our specification and drawings given for example, but should be determined by the broadest reasonable interpretation of our appended claims.

What we claim as our invention is:

1. A, set of two separate platform-extensions for extending each of two oppositely disposed sides of an integral material support platform of a tool, said set of two separate platform-extensions comprising a left hand said platform-extension and a right hand said platform-extension each comprising an elongated member having a generally flat top surface, each of said elongate members affixed with a material guide fence in extending generally perpendicular relationship to said flat top surfaces and in substantially lengthwise alignment with the length of each of said elongated members, a bottom surface adjacent one end of each of said elongated members affixed with a hingedly attached length adjustable support leg for assisting in supporting each said elongated member during use, a hingidly attached short leg affixed to said bottom surface of each of said elongated members adjacent ends thereof oppositely disposed from said length adjustable support legs, each of said short legs structured for clamping in a work bench of a type having a full length clamp, said elongated members for positioning one said elongated member adjacent each of two oppositely disposed sides of a portable tool having an integral material support platform and which is supported elevated by the work bench containing the clamp, each of said short legs including an adjustable depth gauge means providing support means for assisting in positioning said flat top surface of each said elongated member flush with an adjacent top surface of the integral material support platform of the portable tool supported by the work bench.

2. A platform-extension useful for extending an integral material support platform of a portable tool which is supported elevated by a work bench of a type having a clamping means in a top surface of the work bench, said platform-extension comprising an elongated member having a generally flat top surface, said elongated member affixed with a material guide fence in extending generally perpendicular relationship to said flat top surface and substantially in lengthwise alignment with the length of said elongated member, a hingidly attached length adjustable support leg affixed to a bottom surface of said elongated member adjacent one end of said elongated member for assisting in supporting said elongated member during use, a hingidly attached short leg affixed to said bottom surface of said elongated member adjacent an end thereof oppositely disposed from said length adjustable support leg, said short leg structured for clamping in the clamping means of the work bench, the end of said elongated member to which said short leg is affixed being positionable adjacent a side of a portable tool which is supported elevated by the work bench containing the clamping means, said short leg including an adjustable depth gauge means providing support means for assisting in positioning said flat top surface of said elongated member flush with an adjacent top surface of the integral material support platform of the portable tool supported by the work bench.

3. In combination, a portable work bench vise supporting a portable tool on a top surface of said work bench vise, an integral material support platform of said portable tool extended in length by a platform-extension, said platform-extension including a short leg affixed to a bottom surface of said platform-extension, said platform-extension further including a length adjustable support leg affixed to said bottom surface of said platform-extension, said platform-extension affixed substantially stationary relative to said portable work bench vise by way of said short leg being clamped within the vise of said work bench vise and a distal end of said length adjustable support leg resting against a floor, a flat top surface with affixed vertical guide fence of said platform-extension aligned with said flat top surface flush with a top surface of said integral material support platform of said portable tool and with said vertical guide fence aligned with a vertical guide fence of said integral material support platform of said portable tool.

4. In combination, a portable work bench vise supporting a portable tool on a top surface of said work bench vise, an integral material support platform of said portable tool extended in length by a platform-extension, said platform-extension including a first support leg affixed to a bottom surface of said platform-extension, said platform-extension further including a second support leg affixed to said bottom surface of said platform-extension, said platform-extension affixed substantially stationary relative to said work bench vise by way of said first support leg being releasibly clamped within a vise of said work bench vise, said vise defined by a width adjustable gap extending the length of said top surface of said work bench vise, said platform-extension further affixed substantially stationary relative to said work bench vise by a distal end of said second support leg resting against a floor, a flat top surface of said platform-extension aligned flush with a top surface of said integral material support platform of said portable tool.

5. A combination according to claim 4 further including both said first and said second support legs being attached by lockable hinging means to said bottom surface of said platform-extension.

6. A combination according to claim 5 further including said first support leg being substantially shorter in length than said second support leg so as to allow said first support leg to be entirely supported by said work bench vise.

7. A combination according to claim 6 further including said first support leg including an adjustable depth gauging means for determining a distance which said first support leg may enter the vise of said work bench vise.

8. A combination according to claim 7 further including said flat top surface of said platform-extension affixed with a material guide fence extending perpendicularly from said flat top surface along a longitudinal axis of said platform-extension.

9. A combination according to claim 8 further including said platform-extension having an affixed carrying handle.

10. A combination according to claim 9 wherein said portable tool is a portable miter saw.

* * * * *